(12) United States Patent
Sakurai

(10) Patent No.: US 10,127,891 B2
(45) Date of Patent: Nov. 13, 2018

(54) SPATIAL OPTICAL MODULATING SYSTEM

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 160 days.

(21) Appl. No.: 15/335,088

(22) Filed: Oct. 26, 2016

(65) Prior Publication Data

US 2017/0316756 A1   Nov. 2, 2017

(30) Foreign Application Priority Data

Apr. 28, 2016   (JP) ................. 2016-091720

(51) Int. Cl.
| | | |
|---|---|---|
| *G09G 5/10* | (2006.01) | |
| *G02F 1/29* | (2006.01) | |
| *G09G 3/36* | (2006.01) | |

(52) U.S. Cl.
CPC .............. *G09G 5/10* (2013.01); *G02F 1/293* (2013.01); *G09G 3/3696* (2013.01); *G02F 2203/18* (2013.01); *G09G 2310/027* (2013.01)

(58) Field of Classification Search
CPC .......... G09G 3/36–3/3696; G09G 5/10; G09G 2300/0421–2300/043; G09G 2300/0478–2300/0495; G09G 2310/0264–2310/0275; G09G 2320/0233; G09G 2320/0242; G09G 2320/0271; G09G 2320/0276; G09G 2320/0606–2320/062; G09G 2320/0666–2320/0673; G02F 1/13306; G02F 1/137; G02F 1/29–1/335; G02F 2001/291; G02F 2001/294; G02F 2001/311; G02F 2001/3135; G02F 2203/18
See application file for complete search history.

(56) References Cited

U.S. PATENT DOCUMENTS

| | | | |
|---|---|---|---|
| 2009/0135116 A1* | 5/2009 | Chang .................. | G09G 3/3696 345/87 |
| 2014/0036180 A1* | 2/2014 | Takiguchi ................ | G09G 3/36 349/33 |
| 2014/0055692 A1* | 2/2014 | Kroll .................. | G02F 1/134309 349/15 |

FOREIGN PATENT DOCUMENTS

JP   2009-198255 A   9/2009

\* cited by examiner

*Primary Examiner* — Nathan Danielsen
(74) *Attorney, Agent, or Firm* — Osha Liang LLP

(57) ABSTRACT

A system includes a spatial light modulator and a controller. The spatial light modulator is configured to perform phase modulation of a light that passes through a liquid crystal by applying individual voltages to the liquid crystal from each of a plurality of electrodes. The controller is configured to control the voltages applied to the liquid crystal from each of the plurality of electrodes based on phase image data. The phase image data represents values of each pixel corresponding to each of the plurality of electrodes by predetermined gradations. The controller converts gradation values, which are the values of each pixel, into voltages input to the electrodes corresponding to each pixel. The controller is configured to change a fluctuation width from a minimum value to a maximum value of the input voltages corresponding to a fluctuation width from a minimum value to a maximum value of the gradation values.

6 Claims, 7 Drawing Sheets

[FIG.1]
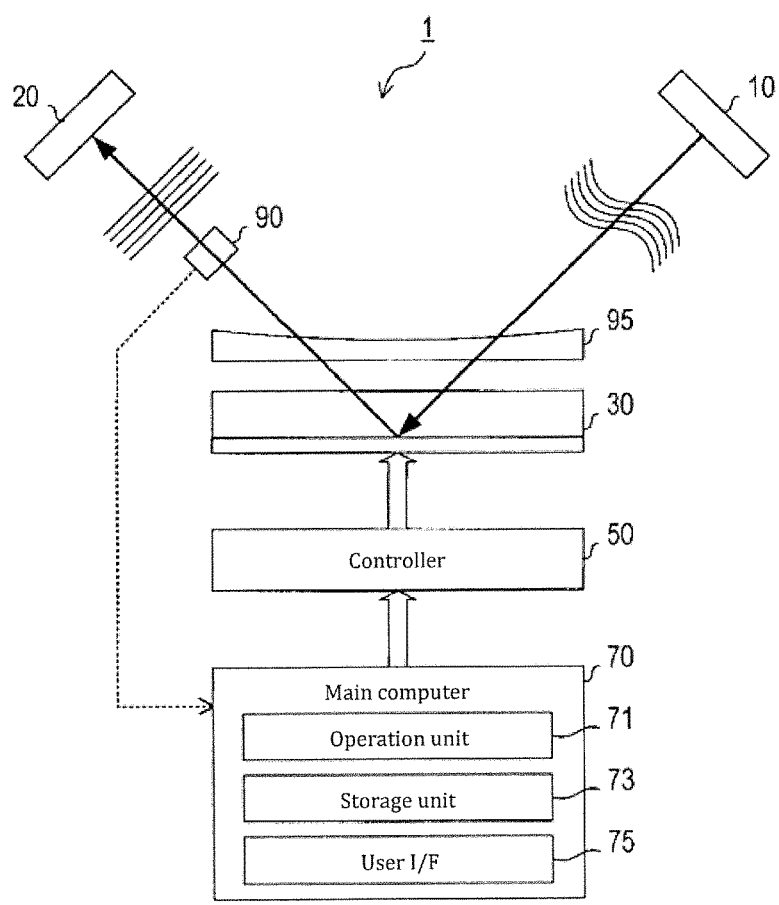

[FIG.2]
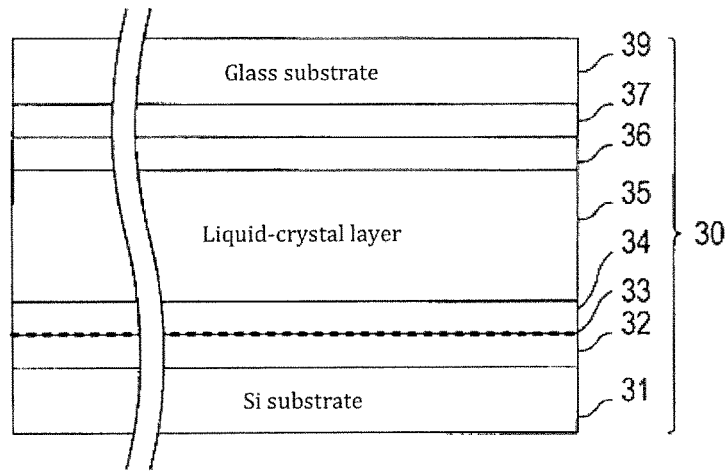
[FIG.3]
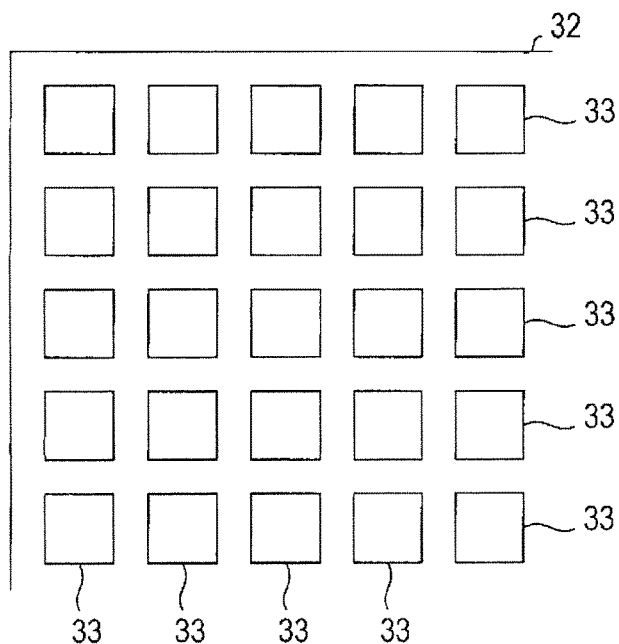

[FIG.4]
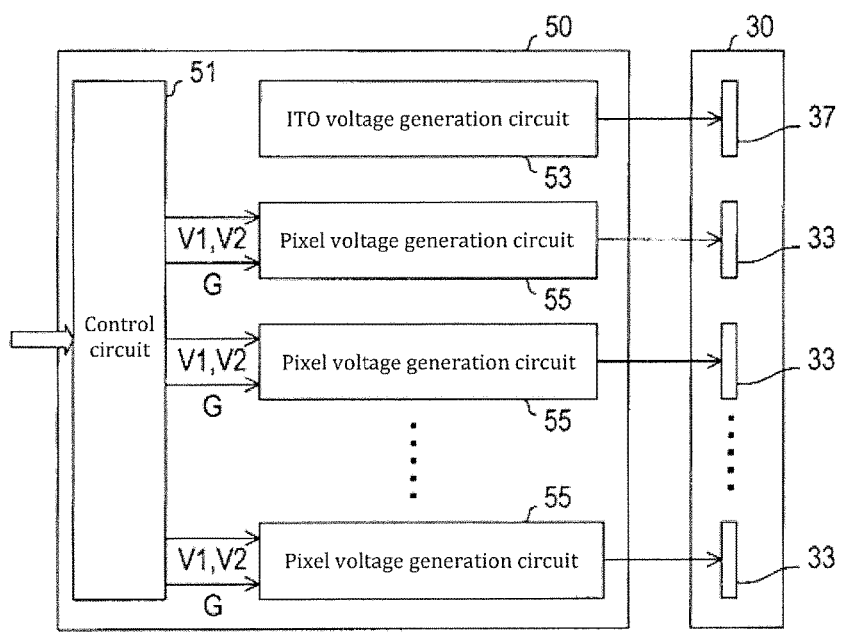

[FIG.5]
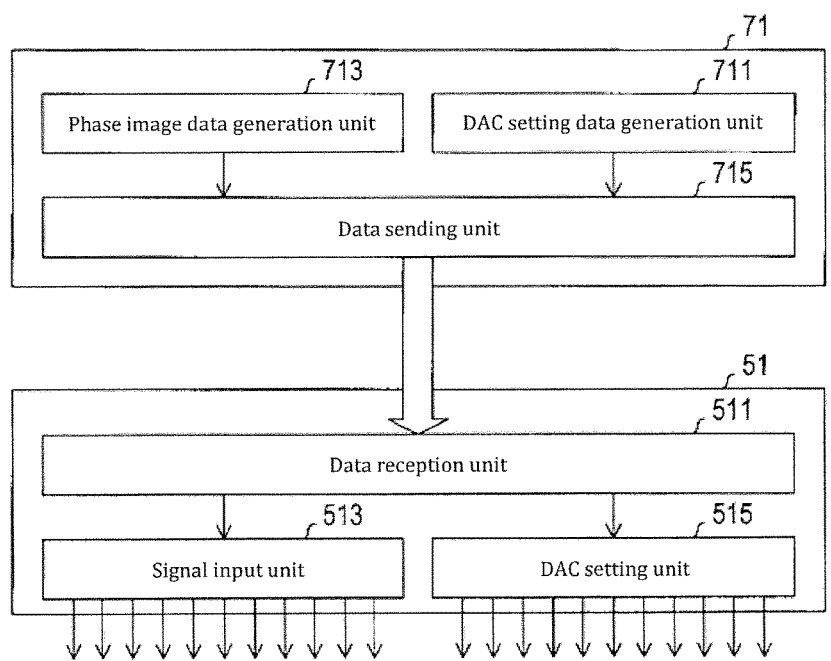

[FIG.6]
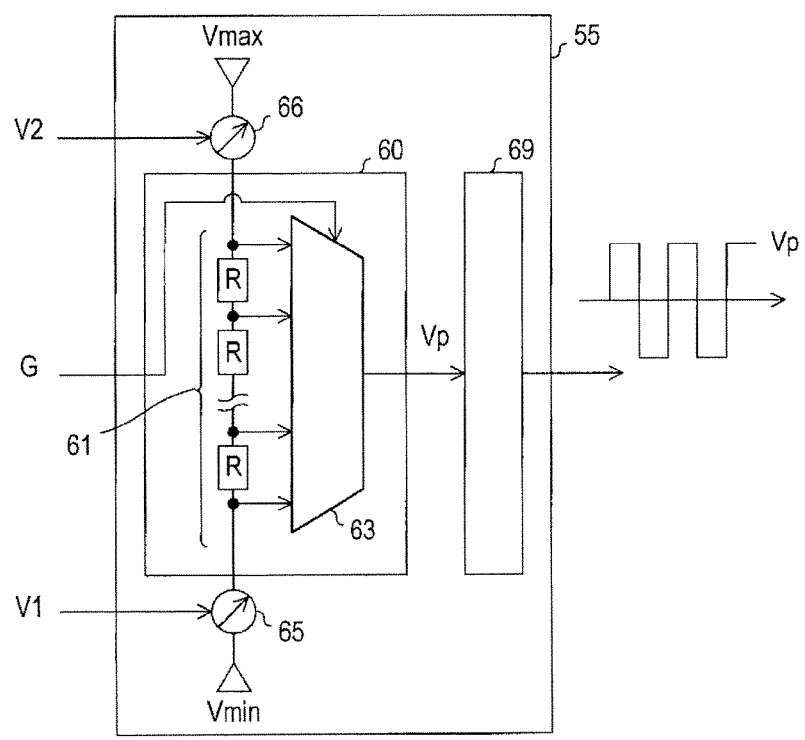

[FIG.7]
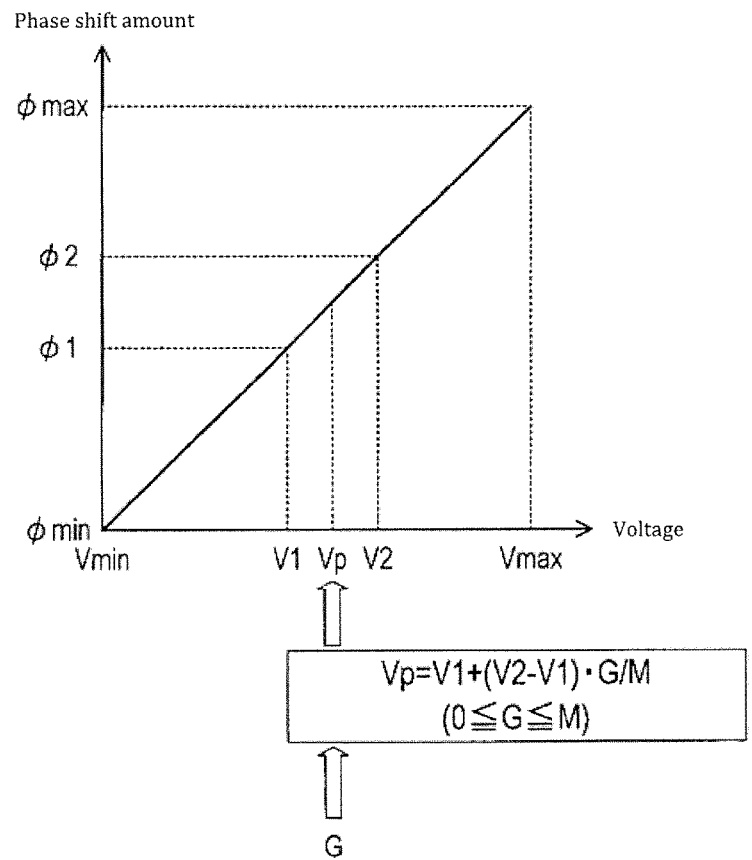
[FIG.8]
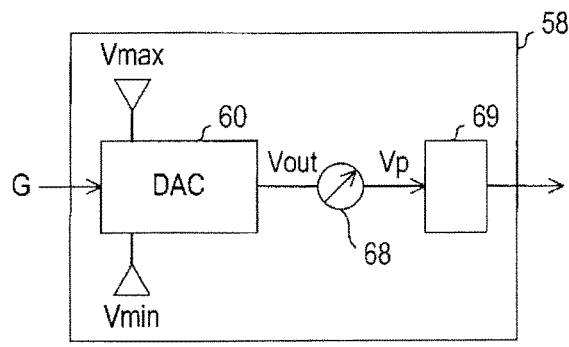

[FIG.9]
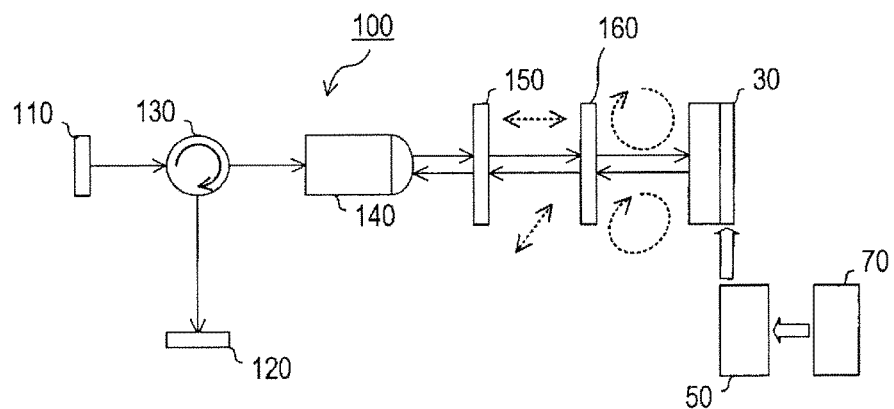
[FIG.10]
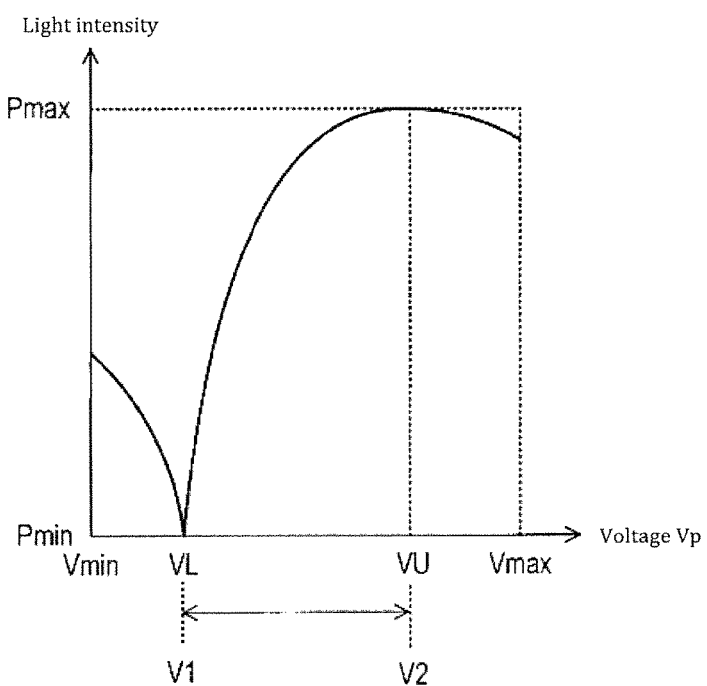

SPATIAL OPTICAL MODULATING SYSTEM

FIELD

The present disclosure relates to a spatial optical modulating system.

BACKGROUND

Spatial optical modulating systems that modulate a spatial distribution of a phase, an amplitude, an intensity, and the like of a light are conventionally known. A spatial optical modulating system is provided with, for example, an optical system that includes a spatial light modulator (SLM), and a controller that controls the spatial light modulator (for example, see patent literature 1).

As the spatial light modulator, a spatial light modulator of a liquid-crystal type—specifically, a spatial light modulator of an LCOS (liquid crystal on silicon) type—is known. A wave front correction system that corrects a distorted wave front by two-dimensionally modulating a phase of a light using the spatial light modulator of the LCOS type is also known.

In the field of astronomy, a method is known of correcting a received wave from space using a MEMS deformable mirror. In this method, by individually controlling a plurality of electrostatic actuators disposed on a back surface of a reflective surface provided by the MEMS deformable mirror, a shape of the reflective surface is controlled to correct a wave front of a wave reflected by the MEMS deformable mirror. Because an ultra-high precision wave front correction capability ($\frac{1}{10,000}\lambda$) is required in the field of astronomy, a MEMS deformable mirror for an astronomical usage is extremely expensive.

CITATION LIST

Patent Literature

[Patent Literature 1] JP 2009-198255 A

SUMMARY

As described above, conventionally, for high-precision spatial light modulation, an expensive modulator such as a MEMS deformable mirror is necessary. In or more embodiments, it is desirable to be able to provide a technique that can realize high-precision spatial light modulation using a comparatively inexpensive spatial light modulator of a liquid-crystal type.

A spatial optical modulating system according to one or more embodiments is provided with a spatial light modulator and a controller. The spatial light modulator is provided with a liquid crystal and a plurality of electrodes arranged along a surface of the liquid crystal. The spatial light modulator is configured to perform phase modulation of a light that passes through the liquid crystal by applying individual voltages to the liquid crystal from each of the plurality of electrodes. The controller is configured to control the voltages applied to the liquid crystal from each of the plurality of electrodes based on phase image data. The phase image data represents values of each pixel corresponding to each of the plurality of electrodes by predetermined gradations.

The controller is provided with a converter that is configured to convert gradation values, which are the values of each pixel represented by the predetermined gradations, into voltages input to the electrodes corresponding to each pixel. According to one or more embodiments, the controller is further provided with a changing circuit that is configured to change a fluctuation width from a minimum value to a maximum value of the input voltages corresponding to a fluctuation width from a minimum value to a maximum value of the gradation values according to an external command.

A phase shift amount of the light by the spatial light modulator changes according to the voltages input to the electrodes. According to the conventional technology, a correspondence relationship between the gradation value and the input voltage is fixed; therefore, a correspondence relationship between the gradation value and the phase shift amount is also fixed. That is, according to the conventional technology, a phase shift amount per one gradation is constant.

In contrast thereto, according to the system according to one or more embodiments, the fluctuation width of the input voltages corresponding to the fluctuation width of the gradation values is changeable. This signifies that in a situation where a necessary range of the phase shift amount is narrow, by an external command, a gradation value can be assigned to the narrow range of the input voltages and the phase shift amount per one gradation can be decreased.

In this manner, according to one or more embodiments, the phase shift amount per one gradation is changeable according to a use environment or usage of the spatial light modulator. Therefore, according to one or more embodiments, high-precision spatial light modulation can be realized using a spatial light modulator of a liquid-crystal type.

The changing circuit can be configured to change the fluctuation width by changing one from among the minimum value and the maximum value of the input voltages. The changing circuit may be configured to change the fluctuation width by changing both the minimum value and the maximum value of the input voltages. According to the latter configuration, the range of the input voltages can be adjusted with a greater degree of freedom.

According to one or more embodiments, the controller can be configured to correct a wave front of the light by a control of the applied voltages based on the phase image data. In this situation, the spatial optical modulating system can function as a wave front correction system.

According to one or more embodiments, the spatial optical modulating system may be provided with one or more optical elements configured to perform wave front correction in a direction suppressing a wave front aberration arising fixedly due to an internal structure of the spatial light modulator. The one or more optical elements can be provided to at least one from among an upstream point and a downstream point of the spatial light modulator in a propagation path of the light.

The one or more optical elements may be configured to overall indicate wave front aberration characteristics reverse of the wave front aberration arising fixedly due to the internal structure of the spatial light modulator. The wave front aberration arising fixedly can also be canceled by adjustment of the gradation values, but in this method, a gradation range that a user can freely use is limited. According to the spatial optical modulating system provided with the above optical elements, the user can meaningfully use substantially an entirety of the gradation range, and high-precision spatial light modulation can be realized.

According to one or more embodiments, the fluctuation width of the input voltages can be set so the spatial light modulator can change a phase of the light in a phase range greater than a phase range that can cancel the wave front aberration arising fixedly due to the internal structure of the spatial light modulator.

According to one or more embodiments, provided may be a spatial optical modulating system, provided with: the above spatial light modulator; a controller that is configured to correct a wave front of the light through the spatial light modulator by controlling applied voltages from each of the plurality of electrodes in the spatial light modulator into voltages corresponding to the values of each pixel represented by the phase image data; and one or more optical elements that are one or more optical elements configured to perform wave front correction in a direction suppressing a wave front aberration arising fixedly due to an internal structure of the spatial light modulator and are disposed at least one from among an upstream point and a downstream point of the spatial light modulator in a propagation path of the light.

According to the spatial optical modulating system configured in this manner, as in a situation of suppressing the wave front aberration arising fixedly due to the internal structure of the spatial light modulator by adjustment of the gradation values, a gradation range that the user can freely use being limited can be suppressed.

As described above, according to one or more embodiments, by one or both from among adjustment of the fluctuation width of the input voltages and disposition of the optical elements, the range of the gradation values that the user can substantially use being limited can be suppressed and high-precision spatial light modulation can be realized.

BRIEF DESCRIPTION OF DRAWINGS

FIG. 1 A diagram representing a schematic configuration of a wave front correction system of a first example according to one or more embodiments.

FIG. 2 A diagram representing a stacked structure of a spatial light modulator.

FIG. 3 A plan view representing a disposition of pixel electrodes in the spatial light modulator.

FIG. 4 A block diagram representing a detailed configuration of a controller.

FIG. 5 A block diagram representing functions had by a control circuit of the controller and a main computer.

FIG. 6 A diagram representing a detailed configuration of a pixel voltage generation circuit.

FIG. 7 A graph representing a correspondence relationship between a voltage applied to the pixel electrodes and a phase shift amount.

FIG. 8 A diagram representing a configuration of an image voltage generation circuit of a modified example.

FIG. 9 A diagram representing a schematic configuration of an intensity modulating system of a second example according to one or more embodiments.

FIG. 10 A graph representing a correspondence relationship between the voltage applied to the pixel electrodes and a light intensity.

DESCRIPTION OF EMBODIMENTS

Illustrative embodiments of the present disclosure are described below together with the drawings.

First Example

A wave front correction system 1 according to one or more embodiments illustrated in FIG. 1 is a system that corrects a wave front of a light input from an input system 10 and outputs the corrected light to the outside from an output system 20. This wave front correction system 1 is provided with the input system 10, the output system 20, a spatial light modulator 30, a controller 50, and a main computer 70. This wave front correction system 1 can optionally be provided with a wave front sensor 90 for feedback control. This wave front correction system 1 can optionally be provided with a correction plate 95 as an optical element for suppressing a wave front aberration arising fixedly due to an internal structure of the spatial light modulator 30.

The input system 10 is an optical system that collimates and inputs to the spatial light modulator 30 the light to be corrected. In a situation of applying the wave front correction system 1 according to one or more embodiments to the field of astronomy, the input system 10 is configured to, for example, input a light arriving from outer space to the spatial light modulator 30. This light is affected by fluctuation of the atmosphere and enters a state where a wave front is distorted. The wave front correction system 1 corrects this distorted wave front. The corrected light output to the outside from the output system 20 is imaged by, for example, an imaging system. By the distorted wave front being corrected by the wave front correction system 1, a clear reproduced image can be obtained in the imaging system.

The spatial light modulator 30 is a liquid-crystal-type spatial light modulator and is specifically an LCOS-type spatial light modulator. The spatial light modulator 30 used in one or more embodiments may be understood as having a configuration similar to a known LCOS-type spatial light modulator 30.

As illustrated in FIG. 2, this spatial light modulator 30 is provided with an address unit 32 where a plurality of pixel electrodes 33 is two-dimensionally arranged as a CMOS back plane on a silicon (Si) substrate 31. The spatial light modulator 30 is made to be a configuration where an orientation layer 34, a liquid-crystal layer 35, an orientation layer 36, an ITO transparent electrode 37, and a glass substrate 39 are stacked on this address unit 32.

The plurality of pixel electrodes 33 functions as reflective electrodes and is configured to reflect the input light arriving from the input system 10 through the glass substrate 39, the ITO transparent electrode 37, the orientation layer 36, the liquid-crystal layer 35, and the orientation layer 34. The reflected light is propagated to the output system 20 through the orientation layer 34, the liquid-crystal layer 35, the orientation layer 36, the ITO transparent electrode 37, and the glass substrate 39.

As illustrated in FIG. 3, this plurality of pixel electrodes 33 is two-dimensionally disposed along a surface of the address unit 32 parallel to a surface of the liquid-crystal layer 35. Individual AC drive signals are input from the controller 50 to each pixel electrode 33. These AC drive signals are alternating-current (AC) voltage signals and are specifically square wave signals indicating an amplitude voltage Vp corresponding to a target phase shift amount φ (see FIG. 6). Hereinbelow, the amplitude voltage Vp of the AC drive signals input to each pixel electrode 33 is expressed as "pixel voltage Vp."

The ITO transparent electrode 37 is disposed opposing the plurality of pixel electrodes 33 interposing the orientation layer 36, the liquid-crystal layer 35, and the orientation layer 34 as a common electrode with the plurality of pixel electrodes 33. A square wave signal indicating a constant amplitude voltage Vi that is an alternating-current voltage signal synchronized with the AC drive signals to the pixel electrodes 33 is input as an AC drive signal from the controller 50 to the ITO transparent electrode 37. Hereinbelow, the amplitude voltage Vi of the AC drive signal input to the ITO transparent electrode 37 is expressed as "ITO voltage Vi."

In the liquid-crystal layer 35, a voltage corresponding to a difference between the ITO voltage Vi and the pixel voltage Vp is applied to each pixel by input of the AC drive signals from the controller 50 synchronized with the ITO transparent electrode 37 and the pixel electrodes 33. By this application, a phase shift according to this applied voltage arises in lights that pass through pixel regions corresponding to each pixel electrode 33 in the liquid-crystal layer 35.

As illustrated in FIG. 4, the controller 50 is provided with a control circuit 51, an ITO voltage generation circuit 53, and a pixel voltage generation circuit 55 for each pixel electrode 33. As illustrated in FIG. 5, the control circuit 51 is provided with a data reception unit 511, a signal input unit 513, and a DAC setting unit 515.

The data reception unit 511 of the control circuit 51 is configured to communicate with the main computer 70 and receive phase image data and DAC setting data from the main computer 70. The phase image data is multiple-value image data in gradations a spatial distribution of the phase shift amount φ to be realized by the spatial light modulator 30. This phase image data expresses a value of each pixel by a digital value of predetermined bits corresponding to a gradation count. Each pixel in the phase image data corresponds to each pixel electrode 33 had by the spatial light modulator 30. Hereinbelow, the value of each pixel indicated by the phase image data is also referred to as a gradation value. For example, in phase image data of 256 gradations, each pixel is expressed by a digital value of 8 bits, and the gradation value adopts a value from 0 to 255.

The DAC setting data indicates values of reference voltages V1, V2 to be set for a DAC 60 (see FIG. 6) had by the pixel voltage generation circuit 55. The DAC 60 is a digital/analog converter. The DAC 60 is configured to convert an input digital value into an analog voltage to be output in a voltage range of a value V1 to a value V2 by the setting of the reference voltages V1, V2.

The signal input unit 513 of the control circuit 51 is configured to input the gradation values of each pixel indicated by the phase image data received by the data reception unit 511 to the pixel voltage generation circuits 55 of the corresponding pixels. The signal input unit 513 is configured to further input a timing signal of a predetermined frequency to the pixel voltage generation circuits 55 and the ITO voltage generation circuit 53. The timing signal is a signal for inputting the AC drive signals synchronized from the plurality of pixel voltage generation circuits 55 and the ITO voltage generation circuit 53 to the address unit 32.

The DAC setting unit 515 is configured to set the reference voltages V1, V2 for the DAC 60 had by each pixel voltage generation circuit 55 based on the DAC setting data received by the data reception unit 511.

The ITO voltage generation circuit 53 generates the AC drive signal for the ITO transparent electrode 37 according to a timing signal input from the control circuit 51. Specifically, the ITO voltage generation circuit 53 generates as the AC drive signal a square wave signal of the constant amplitude voltage Vi whose voltage inverts in a period according to the timing signal and inputs this AC drive signal to the ITO transparent electrode 37.

As illustrated in FIG. 6, the pixel voltage generation circuit 55 for each pixel electrode 33 is provided with the DAC 60 and an AC drive signal generation circuit 69. As described above, the DAC 60 converts a gradation value G of a corresponding pixel input from the control circuit 51 into the pixel voltage Vp. The DAC 60 is configured as an 8-bit DAC in a situation where the phase image data is multiple-value image data of 256 gradations.

According to the example illustrated in FIG. 6, the DAC 60 provided by the pixel voltage generation circuit 55 is an N-bit DAC of a resistor-string type. According to this example, the DAC 60 is provided with a resistor string 61 and a multiplexer 63, and the multiplexer 63, based on the gradation value G input from the control circuit 51, selectively outputs an input from a tap position corresponding to the gradation value G among a plurality of tap positions in the resistor string 61, where resistors R of the same value are lined up in series. By this operation, the DAC 60 converts the gradation value G into the pixel voltage Vp to be output.

In one or more embodiments, voltage adjusters 65, 66 are provided on both ends of the resistor string 61 of the DAC 60. The DAC setting unit 515 sets reference voltages V1, V2 of both ends of the resistor string 61 to the reference voltages V1, V2 indicated by the DAC setting data by a control of the voltage adjusters 65, 66. In this manner, the DAC 60 operates to convert the gradation value G into a pixel voltage corresponding to the reference voltages V1, V2: Vp=V1+(V2−V1)·G/M. That is, the DAC setting unit 515 is configured to set a fluctuation range of the pixel voltage Vp corresponding to a fluctuation range of the gradation value G from a minimum value 0 to a maximum value $M=(2^N-1)$ to a range of the values V1 to V2 based on the DAC setting data.

The AC drive signal generation circuit 69 generates the AC drive signal by inverting the pixel voltage Vp input from the DAC 60 in a predetermined period based on the timing signal from the control circuit 51. This AC drive signal is the square wave signal of the amplitude voltage Vp. The generated AC drive signal is input to the corresponding pixel electrode 33.

Additionally, the main computer 70 is provided with an operation unit 71, a storage unit 73, and a user interface 75 and is configured so the operation unit 71 executes processing based on a program stored by the storage unit 73. The operation unit 71 functions as, for example, as illustrated in FIG. 5, a DAC setting generation unit 711, a phase image data generation unit 713, and a data sending unit 715 by execution of the processing based on the above program.

The DAC setting data generation unit 711 is configured to generate the DAC setting data according to an operation signal from a user input through the user interface 75. The user can input information designating a range of the phase shift amount φ to be realized by the spatial light modulator 30 as the operation signal. Based on this information, the DAC setting data generation unit 711 can generate the DAC setting data, which specifies the pixel voltage Vp corresponding to a lower limit and an upper limit of the phase shift amount φ designated from the user, designates as a setting value of the reference voltage V1 a pixel voltage Vp corresponding to the lower limit of the phase shift amount φ, and designates as a setting value of the reference voltage V2 a pixel voltage Vp corresponding to the upper limit of the phase shift amount φ.

The phase image data generation unit 713 is configured to, for example, generate phase image data based on information relating to the distortion of the wave front to be corrected. The phase image data generation unit 713 for example acquires an input signal from the wave front sensor 90 that detects the wave front of the light output from the spatial light modulator 30 as the information relating to the distortion of the wave front to be corrected and can, based on this information, generate the phase image data for suppressing the distortion of the wave front.

The data sending unit 715 communicates with the controller 50 and sends the phase image data and the DAC setting data to the controller 50. Configuring a feedback control system using the wave front sensor 90 is meaningful in appropriate correction of the distortion of the wave front, which changes over time.

FIG. 7 illustrates by a graph a relationship between the pixel voltage Vp and the phase shift amount $\varphi$ that arises in the light that passes through the corresponding pixel region of the liquid-crystal layer 35 by the pixel voltage Vp. As can be understood from this graph as well, there is a substantially proportional relationship between the pixel voltage Vp and the phase shift amount $\varphi$.

Here, a situation is considered where the reference voltage V2 is set to a maximum value Vmax and the reference voltage V1 is set to a minimum value Vmin. In this situation, a range of $\varphi$min to $\varphi$max of the phase shift amount $\varphi$ from a phase shift amount $\varphi$min realized by the pixel voltage Vp=Vmin to a phase shift amount $\varphi$max realized by the pixel voltage Vp=Vmax comes to be controlled by phase image data of predetermined gradations. In this situation, a phase shift amount $\Delta\varphi$ per one gradation is ($\varphi$max−$\varphi$min)/M.

In contrast thereto, a situation is considered where the reference voltage V2 is set to a value smaller than the maximum value Vmax and the reference voltage V1 is set to a value greater than the minimum value Vmin. In this situation, a range of $\varphi$1 to $\varphi$2 of the phase shift amount $\varphi$ from a phase shift amount $\varphi$1 realized by the pixel voltage Vp=V1 to a phase shift amount $\varphi$2 realized by the pixel voltage Vp=V2 comes to be controlled by phase image data of predetermined gradations. In this situation, the phase shift amount $\Delta\varphi$ per one gradation is ($\varphi$2−$\varphi$1)/M.

In this manner, according to the wave front correction system 1 according to one or more embodiments that can change the reference voltages V1, V2 of the DAC 60, in a situation where the wave front to be corrected fluctuates in a comparatively narrow phase range, by setting the reference voltages V1, V2 to match this narrow fluctuation, a phase resolution in this phase range can be increased.

Therefore, according to the wave front correction system 1 according to one or more embodiments, a capability had by the spatial light modulator 30 of the inexpensive LCOS type can be meaningfully utilized to perform appropriate wave front correction according to a use environment of the user or a size of the fluctuation of the wave front to be wave-front corrected, and high-precision spatial light modulation can be realized.

In other words, the LCOS-type spatial light modulator 30 gives rise to a wave front aberration in the input light due to the internal structure thereof. Specifically, the LCOS-type spatial light modulator 30 is affected by a manufacturing process and a precision of components to fixedly give rise to a wave front aberration in the input light of about $2\pi$ to $4\pi$ in the phase.

So no wave front aberration due to the internal structure appears in the output light from the spatial light modulator 30, a component for canceling the wave front aberration due to the internal structure can be included in the spatial distribution of the phase shift amount $\varphi$ indicated by the phase image data.

However, in a method of including such a component in the phase image data, a gradation range that the user can use effectively for an object of wave front correction is limited.

Moreover, even in a situation where the fluctuation of the wave front to be corrected is small, a need arises of setting the range of the pixel voltage Vp wide so the wave front aberration due to the internal structure can be canceled, which restricts setting of the reference voltages V1, V2. That is, the reference voltages V1, V2 must be set so the spatial light modulator 30 can modulate the phase of the input light in a phase range greater than a phase range that can cancel the wave front aberration arising due to the internal structure of the spatial light modulator 30. In this manner, in the above method, by setting of the reference voltages V1, V2, a limit arises in improving the resolution by decreasing the phase shift amount $\Delta\varphi$ per one gradation.

Therefore, while optional, as illustrated in FIG. 1, the correction plate 95 may provided in a propagation path of the light from the input system 10 to the output system 20 for suppressing the wave front aberration arising fixedly due to the internal structure of the spatial light modulator 30.

The correction plate 95 can be configured as an optical lens. According to the example illustrated in FIG. 1, the correction plate 95 is disposed along a surface of the spatial light modulator 30 and corrects the wave front of the light input to the spatial light modulator 30 and the light output from the spatial light modulator 30 in a direction suppressing the wave front aberration due to the internal structure. This correction plate 95 can be configured to indicate, over an entirety of a path including upstream and downstream of the spatial light modulator 30, wave front aberration characteristics reverse of the wave front aberration arising due to the internal structure of the spatial light modulator 30.

In a situation where the wave front aberration due to the internal structure of the spatial light modulator 30 is removed from the light propagated to the output system 20 by the reverse wave front aberration characteristics had by the correction plate 95, a need is eliminated for the phase image data to include the component that cancels the wave front aberration due to the internal structure. Therefore, according to the wave front correction system 1 provided with the correction plate 95, the phase shift amount $\Delta\varphi$ per one gradation can be decreased by narrowing the fluctuation range of the pixel voltage Vp to match the fluctuation of the wave front of the light to be corrected, and the phase resolution can be improved. By providing the correction plate 95 in this manner, more high-precision wave front correction can be realized.

Next, a modified example of the pixel voltage generation circuit 55 is described. The pixel voltage generation circuit 55 illustrated in FIG. 6 may be changed to a pixel voltage generation circuit 58 illustrated in FIG. 8. The pixel voltage generation circuit 58 of the modified example illustrated in FIG. 8 is provided with a voltage adjuster 68 between the DAC 60 and the AC drive signal generation circuit 69. This pixel voltage generation circuit 55 is configured to correct an output voltage Vout from the DAC 60 by the voltage adjuster 68 and generate the pixel voltage Vp. The DAC setting unit 515 of the control circuit 51 can control the voltage adjuster 68 based on the DAC setting data so the pixel voltage Vp becomes the value V1 at the minimum gradation value G=0 and so the pixel voltage Vp becomes the value V2 at the maximum gradation value G=M. The value V1 can be fixedly zero together with the value Vmin. Effects similar to the above example according to one more embodiments can be obtained even by such a control of the pixel voltage Vp.

In other words, the configurations of the pixel voltage generation circuits 55, 58 in the first example according to one or more embodiments and the modified example may be applied to an intensity modulating system 100 using the spatial light modulator 30.

Second Example

As illustrated in FIG. 9, the intensity modulating system 100 of a second example according to one or more embodiments is provided with an input system 110, an output system 120, a light circulator 130, a collimator 140, a polarizer 150, a quarter-wave plate 160, the spatial light modulator 30, the controller 50, and the main computer 70. Components with the same reference signs as the first example may be understood as having configurations similar to the first example.

In this intensity modulating system 100, an input light from the input system 110 is guided to the collimator 140 through the light circulator 130 and collimated by the collimator 140. The collimated input light is input to the polarizer 150 and converted into a linearly-polarized light. The linearly-polarized light is input to the quarter-wave plate 160, converted into a circularly-polarized light, and input to the spatial light modulator 30. The spatial light modulator 30 converts the input circularly-polarized light into an elliptically-polarized light to be output. The elliptically-polarized light is again input to the quarter-wave plate 160 and converted into a linearly-polarized light. This linearly-polarized light is input to the output system 120 through the polarizer 150, the collimator 140, and the light circulator 130.

An intensity of the input light from the input system 110 is adjusted by undergoing conversion into the elliptically-polarized light by the spatial light modulator 30 and conversion into the linearly-polarized light by the quarter-wave plate 160 and being propagated to an output-system 120 side as a linearly-polarized light with a different angle relative to a polarization axis of the polarizer 150. Because an optical system of the intensity modulating system 100 that modulates the intensity based on such a principle is known, further detailed description is omitted.

With the intensity modulating system 100 according to one or more embodiments, the controller 50 has a configuration similar to the first example according to one or more embodiments and is characterized by being configured to be able to change a correspondence relationship between the gradation value G and the pixel voltage Vp by setting of the reference voltages V1, V2 based on the DAC setting data from the main computer 70.

FIG. 10 illustrates a correspondence relationship between an intensity P of the light output to the outside from the output system 120 and the pixel voltage Vp. From this diagram, it can be understood that the intensity modulating system 100 can adjust the light intensity P from a minimum value Pmin to a maximum value Pmax if the pixel voltage Vp is changed in a limited range VL to VU even if the pixel voltage Vp is not changed from the minimum value Vmin to the maximum value Vmax. Therefore, the user can improve a resolution relating to adjustment of the light intensity P by setting the output voltage range V1 to V2 of the DAC 60 to the range VL to VU where the light intensity P changes from the minimum value Pmin to the maximum value Pmax.

For example, in a situation where the reference voltage V1 is the minimum value Vmin and the reference voltage V2 is the maximum value Max, the light intensity P comes to be controlled from the minimum value Pmin to the maximum value Pmax by changing the pixel voltage Vp from the value VL to the value VU using a predetermined ratio (VU−VL)/(Vmax−Vmin) of the range of the gradation value G from the value 0 to the value M. Meanwhile, when the reference voltage V1 is the pixel voltage Vp=VL that realizes the light intensity Pmin and the reference voltage V2 is the pixel voltage Vp=VU that realizes the light intensity Pmax, the light intensity P can be controlled from the minimum value Pmin to the maximum value Pmax by changing the pixel voltage Vp from the value VL to the value VU using an entirety of the range of the gradation value G from the value 0 to the value M.

In this manner, in a situation of the former, a change amount ΔP of the light intensity per one gradation is ΔP=(Pmax−Pmin)/{M×(VU−VL)/(Vmax−Vmin)}, and in a situation of the latter, the change amount ΔP of the light intensity per one gradation is ΔP=(Pmax−Pmin)/M. A control precision of the light intensity P in the situation of the latter is clearly higher than the situation of the former.

According to the intensity modulating system 100, the correspondence relationship between the pixel voltage Vp and the light intensity P greatly changes according to wavelength. Because of this, in a conventional system where the reference voltages V1, V2 cannot be changed, the wider a wavelength range that is handled, the more a need arises of assigning gradation values to a voltage range unnecessary for a specified wavelength, and performing high-precision intensity modulation is difficult.

In contrast thereto, according to the intensity modulating system 100 according to one or more embodiments, because the gradations can be assigned to a voltage range minimally necessary according to the use environment, the capability had by the spatial light modulator 30 of the LCOS type can be meaningfully utilized to realize high-precision intensity modulation.

Other Embodiments

Illustrative embodiments of the present disclosure are described above, but the technique of the present disclosure is not limited to the above embodiments and can adopt various other embodiments. For example, the technique of the present disclosure is not limited to the wave front correction system 1 and the intensity modulating system 100 and can be applied to various systems where a change in the correspondence relationship between the gradation value G and the pixel voltage Vp leads to meaningful effects.

The wave front correction system 1 of the first example according to one or more embodiments may be configured as a system that fixes the correspondence relationship between the gradation value G and the pixel voltage Vp. In this situation, the wave front correction system 1 can be provided with the correction plate 95. According to the correction plate 95, as described above, because the influence of the wave front aberration due to the internal structure of the spatial light modulator 30 can be suppressed, the user can more meaningfully utilize the spatial light modulator 30. Note that a plurality of correction plates 95 may be provided in the propagation path of the light from the input system 10 to the output system 20. In this situation, the plurality of correction plates can be disposed to indicate overall wave front aberration characteristics reverse of the wave front aberration characteristics due to the internal structure of the spatial light modulator 30.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

[Correspondence Relationships]

Correspondence relationships between terms are as follows. The DAC 60 corresponds to one example of the converter provided by the controller, the DAC setting unit 515 corresponds to one example of the changing circuit, the DAC setting data corresponds to one example of the external command, the pixel voltage Vp corresponds to one example of the voltages input to the electrodes, and the reference voltage V1 and the reference voltage V2 respectively correspond to the minimum value and the maximum value of the input voltages.

REFERENCE SIGNS LIST

1 . . . wave front correction system; 10, 110 . . . input system; 20, 120 . . . output system; 30 . . . spatial light modulator; 31 . . . silicon substrate; 32 . . . address unit; 33 . . . pixel electrode; 34, 36 . . . orientation layer; 35 . . . liquid-crystal layer; 37 . . . ITO transparent electrode; 39 . . . glass substrate; 50 . . . controller; 51 . . . control circuit; 53 . . . ITO voltage generation circuit; 55, 58 . . . pixel voltage generation circuit; 60 . . . DAC; 61 . . . resistor string; 63 . . . multiplexer; 65, 66, 68 . . . voltage adjuster; 69 . . . AC drive signal generation circuit; 70 . . . main computer; 71 . . . operation unit; 73 . . . storage unit; 75 . . . user interface; 90 . . . wave front sensor; 95 . . . correction plate; 100 . . . intensity modulating system; 130 . . . light circulator; 140 . . . collimator; 150 . . . polarizer; 160 . . . quarter-wave plate; 511 . . . data reception unit; 513 . . . signal input unit; 515 . . . DAC setting unit; 711 . . . DAC setting data generation unit; 713 . . . phase image data generation unit; 715 . . . data sending unit.

The invention claimed is:

1. A spatial optical modulating system, comprising:
a spatial light modulator that comprises a liquid crystal and a plurality of electrodes arranged along a surface of the liquid crystal and that performs phase modulation of a light that passes through the liquid crystal by applying individual voltages to the liquid crystal from each of the plurality of electrodes; and
a controller that controls the voltages applied to the liquid crystal from each of the plurality of electrodes based on phase image data representing values of each pixel corresponding to each of the plurality of electrodes by predetermined gradations;
wherein the controller comprises:
a converter that converts gradation values, which are the values of each pixel represented by the predetermined gradations in the phase image data, into input voltages to the electrodes corresponding to each pixel and
a changing circuit that changes a fluctuation width from a minimum value to a maximum value of the input voltages corresponding to a fluctuation width from a minimum value to a maximum value of the gradation values according to an external command,
wherein the controller corrects a wave front of the light by a control of the applied voltages based on the phase image data, and
wherein the fluctuation width of the input voltages is set so the spatial light modulator changes a phase of the light in a phase range greater than a phase range that can cancel the wave front aberration arising fixedly due to the internal structure of the spatial light modulator.

2. The spatial optical modulating system according to claim 1, wherein the changing circuit changes the fluctuation width by changing the minimum value and the maximum value of the input voltages.

3. The spatial optical modulating system according to claim 1, further comprising one or more optical elements that perform wave front correction in a direction suppressing a wave front aberration arising fixedly due to an internal structure of the spatial light modulator, wherein at least one of the one or more optical elements is disposed from among an upstream point and a downstream point of the spatial light modulator in a propagation path of the light.

4. The spatial optical modulating system according to claim 3, wherein the one or more optical elements indicate wave front aberration characteristics reverse of the wave front aberration arising fixedly due to the internal structure of the spatial light modulator.

5. A spatial optical modulating system, comprising:
a spatial light modulator that comprises a liquid crystal and a plurality of electrodes arranged along a surface of the liquid crystal and that performs phase modulation of a light that passes through the liquid crystal by applying individual voltages to the liquid crystal from each of the plurality of electrodes;
a controller that corrects a wave front of the light by controlling, based on phase image data representing values of each pixel corresponding to each of the plurality of electrodes by predetermined gradations, applied voltages from each of the plurality of electrodes in the spatial light modulator into voltages corresponding to the values of each pixel represented by the phase image data; and
one or more optical elements that perform wave front correction in a direction suppressing a wave front aberration arising fixedly due to an internal structure of the spatial light modulator, wherein at least one of the one or more optical elements is disposed from among an upstream point and a downstream point of the spatial light modulator in a propagation path of the light,
wherein a fluctuation width of the individual voltages is set so the spatial light modulator changes a phase of the light in a phase range greater than a phase range that can cancel the wave front aberration arising fixedly due to the internal structure of the spatial light modulator.

6. The spatial optical modulating system according to claim 5, wherein the one or more optical elements indicate wave front aberration characteristics reverse of the wave front aberration arising fixedly due to the internal structure of the spatial light modulator.

* * * * *